United States Patent
Jin et al.

(10) Patent No.: US 12,131,384 B1
(45) Date of Patent: Oct. 29, 2024

(54) REAL-TIME PEER-TO-PEER ENERGY TRADING METHOD CONSIDERING TIME-VARYING VIRTUAL ENERGY STORAGE

(71) Applicant: TIANJIN UNIVERSITY, Tianjin (CN)

(72) Inventors: Xiaolong Jin, Tianjin (CN); Xiaoyu Wang, Tianjin (CN); Hongjie Jia, Tianjin (CN); Yunfei Mu, Tianjin (CN); Xiaodan Yu, Tianjin (CN); Xiandong Xu, Tianjin (CN)

(73) Assignee: TIANJIN UNIVERSITY, Tianjin (CN)

( * ) Notice: Subject to any disclaimer, the term of this patent is extended or adjusted under 35 U.S.C. 154(b) by 0 days.

(21) Appl. No.: 18/674,954

(22) Filed: May 27, 2024

(30) Foreign Application Priority Data

Jul. 18, 2023   (CN) ......................... 202310880967.2

(51) Int. Cl.
   *G06Q 40/04*      (2012.01)
   *G06Q 50/06*      (2012.01)

(52) U.S. Cl.
   CPC ............. *G06Q 40/04* (2013.01); *G06Q 50/06* (2013.01)

(58) Field of Classification Search
   CPC ............................... G06Q 40/04; G06Q 50/06
   See application file for complete search history.

(56) References Cited

U.S. PATENT DOCUMENTS

2016/0098794 A1* 4/2016 Mokhtari ............... G06Q 40/04
                                                                705/37

2017/0371306 A1* 12/2017 Sossan .................... H02J 3/004
2021/0257836 A1*  8/2021 Ku .......................... H02J 3/008
(Continued)

FOREIGN PATENT DOCUMENTS

EP         3493347 A1 *  6/2019  ............... H02J 3/00
KR     102601197 B1 * 11/2023  ............. G05B 15/02

OTHER PUBLICATIONS

An et al.,: Determiming the Peer-to-Peer electricity trading price and strategy for energy prosumers and consumer within a microgrid, 2020, Applied Energy, 261, pp. 1-16. (Year: 2020).*

(Continued)

*Primary Examiner* — Bijendra K Shrestha

(57) ABSTRACT

The invention pertains to optimal scheduling and trading technology for microgrid systems, specifically focusing on a real-time peer-to-peer energy trading method involving time-varying virtual energy storage. This method predicts environmental information within a specified time domain and incorporates historical transaction data into virtual energy storage modeling and real-time energy trading. During the supply and demand energy extraction phase, it quantitatively extracts supply and demand energy and the marginal cost for trading using an autonomous energy management model for prosumers. In the transaction price optimization phase, it optimizes the transaction price based on historical data to maximize prosumers' income. The distributed transaction decision optimization method, utilizing a continuous double auction, enhances transaction matching decisions to maximize prosumers' income and accommodate multi-transaction preference levels. This approach leverages the complementary potential of energy resources to balance supply and demand within the system.

3 Claims, 8 Drawing Sheets

(56) References Cited

U.S. PATENT DOCUMENTS

2022/0138873 A1* 5/2022 Yoo ............... G06Q 30/0283
705/412

OTHER PUBLICATIONS

Wang et al.,: Congestion management under peer-to peer energy trading scheme among micergrids through cooperative game, 2022, Energy Reports 8, pp. 59-66 (Year: 2022).*

W. Tushar, C. Yuen, TK. Saha et al., "Peer-to-peer energy systems for connected communities: A review of recent advances and emerging challenges," Applied Energy, vol. 282, pp. 116131, 2021.

X. Jin, Q. Wu, and H. Jia, "Local flexibility markets: Literature review on concepts, models and clearing methods," Applied Energy, vol. 261, pp. 114387, 2020.

J. Dong, C. Song, S. Liu, et al., "Decentralized peer-to-peer energy trading strategy in energy blockchain environment: A game-theoretic approach," Applied Energy, vol. 325, pp. 119852, 2022.

J. An, M. Lee, S. Yeom, et al., "Determining the Peer-to-Peer electricity trading price and strategy for energy prosumers and prosumers within a microgrid," Applied Energy, vol. 261, pp. 114335, 2020.

Y. Zhou, J. Wu, Song G, et al., "Framework design and optimal bidding strategy for ancillary service provision from a peer-to-peer energy trading community," Applied Energy, vol. 278, pp. 115671, 2020.

Z. Zhang, H. Tang, P. Wang, et al., "Two-stage bidding strategy for Peer-to-Peer energy trading of Nanogrid," IEEE Trans. Industry Applications, vol. 56, No. 2, pp. 1000-1009, 2020.

S. Li, J. Zhu, H. Dong, "A novel energy sharing mechanism for smart microgrid," IEEE Trans. Smart Grid., vol. 99, pp. 1-1, 2021.

Z. Wang, X. Yu, Y. Mu, et al., "Peer-to-Peer energy trading strategy for energy balance service provider (EBSP) considering market elasticity in community microgrid," Applied Energy, vol. 303, pp. 117596, 2020.

Z. Wang, X. Yu, Y. Mu, et al., "A distributed Peer-to-Peer energy transaction method for diversified prosumers in Urban Community Microgrid System," Applied Energy, vol. 260, pp. 114327, 2020.

X. Jin, Y. Mu, H. Jia, et al., "Dynamic economic dispatch of a hybrid energy microgrid considering building based virtual energy storage system," Applied Energy, vol. 194, pp. 386-398, 2016.

X. Jin, T. Jiang, Y. Mu, et al., "Scheduling distributed energy resources and smart buildings of a Microgrid via multi- time scale and model predictive control method," IET Renewable Power Generation, vol. 13, No. 6, pp. 816-833, 2019.

D. Vang, X. Jing, J. Qiu, et al., "Coordinated dispatch of virtual energy storage systems in LV grids for voltage regulation," IEEE Trans. Industrial Informatics, 2018.

K. Kumar, K. Vijayakumar and C. Kalpesh, "Virtual energy storage capacity estimation using ANN-based kWh modelling of refrigerators," IET Smart Grid, pp. 31-39, 2018.

Y. Gao, S. Li, X. Fu, et al., "Energy management and demand response with intelligent learning for multi-thermal-zone buildings," Energy, vol. 210, pp. 118411, 2020.

N. Liu, L. Tan, H. Sun, et al., "Bilevel heat-electricity energy sharing for integrated energy systems with energy hubs and prosumers," IEEE Trans. on Industrial Informatics, vol. 18, pp. 3754-3764, 2022.

S. Cui, J. Xiao, "Game-based peer-to-peer energy sharing management for a community of energy buildings," International Journal of Electrical Power & Energy Systems, vol. 123, pp. 106204, 2020.

M. Song, C. Gao, S. Ma, et al., "Distributed scheduling of HVACs based on transactive energy and ADMM," Applied Energy, vol. 325, pp. 119831, 2022.

J. Wu, J. Hu, X. Ai, et al., "Multi-time scale energy management of electric vehicle model-based prosumers by using virtual battery model," Applied Energy, vol. 251, pp. 113312, 2019.

J. Li, G. D. Xu, J. Wang, et al., "P2P multigrade energy trading for heterogeneous distributed energy resources and flexible demand," IEEE Trans. on Smart Grid, vol. 14, pp. 1577-1589, 2023.

T. Morstyn and M. McCulloch, "Multiclass energy management for Peer-to-Peer energy trading driven by prosumer preferences," IEEE Trans. on Power Systems, vol. 34, pp. 4005-4014, 2019.

* cited by examiner

REAL-TIME PEER-TO-PEER ENERGY TRADING METHOD CONSIDERING TIME-VARYING VIRTUAL ENERGY STORAGE

TECHNICAL FIELD

The invention relates to a real-time peer-to-peer energy trading method considering time-varying virtual energy storage, which belongs to the field of optimal scheduling and trading technology of microgrid systems.

BACKGROUND ART

When facing the increasing proportion of renewable energy, the energy management and operation control of urban park microgrid systems will face many challenges [1-2]. By introducing a decentralized and autonomous distributed Peer-to-Peer (P2P) energy trading mechanism into the microgrid system, the tradable potential of user-side flexible resources can be fully tapped, and the supply and demand matching space between multiple prosumers can be further expanded, the balance of energy supply and demand within the microgrid system and the efficient use of renewable energy are promoted effectively, and the overall economy of the microgrid is improved [3-5].

In peer-to-peer energy trading, prosumers can flexibly adjust their own energy production and consumption behavior by using energy storage resources. Specifically, peak-valley arbitrage can be achieved by coordinating the charging and discharging behavior of photovoltaic power generation equipment and energy storage resources. At present, some scholars at home and abroad have done a lot of research on the application of energy storage resources in peer-to-peer energy trading methods [6-7]. At the same time, scholars have also studied the impact of the application on the utility of aggregators and communities. However, the current cost of energy storage resources is still high, especially for single residential users or communities [8-9]. The characteristics of high cost and low return of energy storage resources have an impact on its application in peer-to-peer energy trading, which may lead to the impossibility of arbitrage trading of renewable energy by prosumers and hinder the development of the peer-to-peer energy trading market. Therefore, the application of more existing auxiliary energy storage resources is of great significance to the peer-to-peer energy trading of prosumers.

The building thermal inertia of prosumers can be modeled as a virtual energy storage system [10-12]. With the assistance of this system, prosumers can orderly schedule the heating/cooling requirements of their own buildings to reduce their energy costs and make their comfort within an acceptable range. At present, the virtual energy storage system has been applied to various aspects, such as auxiliary services of the power grid, local renewable energy fluctuation balance, and building energy conservation [13-14]. The current literature rarely studies the application of virtual energy storage in peer-to-peer energy trading. Although a literature has proposed an optimization method that can quantify the overall flexibility of the building, it does not consider the time-varying characteristics of the virtual energy storage system, which may lead to errors in the quantified flexibility [14]. Among them, the traditional virtual energy storage system does not consider the time-varying characteristics of heat dissipation power caused by indoor and outdoor temperature differences, and its own capacity is obtained by quantifying heat energy. Therefore, it is of great significance to construct a virtual energy storage model for power storage for prosumers to participate in the peer-to-peer energy trading decision-making process in a better way.

At present, works of literature have proposed peer-to-peer energy trading decision implementation methods considering building thermal inertia [15-18]. These methods mainly focus on the trading behavior between the overall energy flexibility of the prosumers themselves. However, these works of literature contain less analysis of specific energy characteristics and trading processes, such as the trading capacity and price of each type of energy resource, and the matching process between specific types of energy resources of prosumers and specific prosumers. In addition, the existing research only considers the single transaction preference level of prosumers, and prosumers can only trade with a few other prosumers, which may lead to fewer peer-to-peer energy transactions, lower economic benefits, and renewable energy utilization of prosumers [19-20]. With the emergence of prosumers with multiple energy resources and heterogeneous trading preferences, it is urgent to propose a more comprehensive distributed peer-to-peer energy trading implementation method.

REFERENCES

[1] W. Tushar, C. Yuen, TK. Saha et al., "Peer-to-peer energy systems for connected communities: A review of recent advances and emerging challenges," Applied Energy, vol. 282, pp. 116131, 2021.

[2] X. Jin, Q. Wu, and H. Jia, "Local flexibility markets: Literature review on concepts, models and clearing methods," Applied Energy, vol. 261, pp. 114387, 2020.

[3] J. Dong, C. Song, S. Liu, et al., "Decentralized peer-to-peer energy trading strategy in energy blockchain environment: A game-theoretic approach," Applied Energy, vol. 325, pp. 119852, 2022.

[4] J. An, M. Lee, S. Yeom, et al., "Determining the Peer-to-Peer electricity trading price and strategy for energy prosumers and prosumers within a microgrid," Applied Energy, vol. 261, pp. 114335, 2020.

[5] Y. Zhou, J. Wu, Song G, et al., "Framework design and optimal bidding strategy for ancillary service provision from a peer-to-peer energy trading community," Applied Energy, vol. 278, pp. 115671, 2020.

[6] Z. Zhang, H. Tang, P. Wang, et al., "Two-stage bidding strategy for Peer-to-Peer energy trading of Nanogrid," IEEE Trans. Industry Applications, vol. 56, no. 2, pp. 1000-1009, 2020.

[7] S. Li, J. Zhu, H. Dong, "A novel energy sharing mechanism for smart microgrid," IEEE Trans. Smart Grid., vol. 99, pp. 1-1, 2021.

[8] Z. Wang, X. Yu, Y. Mu, et al., "Peer-to-Peer energy trading strategy for energy balance service provider (EBSP) considering market elasticity in community microgrid," Applied Energy, vol. 303, pp. 117596, 2020.

[9] Z. Wang, X. Yu, Y. Mu, et al., "A distributed Peer-to-Peer energy transaction method for diversified prosumers in Urban Community Microgrid System," Applied Energy, vol. 260, pp. 114327, 2020.

[10] X. Jin, Y. Mu, H. Jia, et al., "Dynamic economic dispatch of a hybrid energy microgrid considering building based virtual energy storage system," Applied Energy, vol. 194, pp. 386-398, 2016.

[11] X. Jin, T. Jiang, Y. Mu, et al., "Scheduling distributed energy resources and smart buildings of a Microgrid via

[12] D. Vang, X. Jing, J. Qiu, et al., "Coordinated dispatch of virtual energy storage systems in LV grids for voltage regulation," IEEE Trans. Industrial Informatics, 2018.

[13] K. Kumar, K. Vijayakumar and C. Kalpesh, "Virtual energy storage capacity estimation using ANN-based kWh modelling of refrigerators," IET Smart Grid, pp. 31-39, 2018.

[14] Y. Gao, S. Li, X. Fu, et al., "Energy management and demand response with intelligent learning for multi-thermal-zone buildings," Energy, vol. 210, pp. 118411, 2020.

[15] N. Liu, L. Tan, H. Sun, et al., "Bilevel heat-electricity energy sharing for integrated energy systems with energy hubs and prosumers," IEEE Trans. on Industrial Informatics, vol. 18, pp. 3754-3764, 2022.

[16] S. Cui, J. Xiao, "Game-based peer-to-peer energy sharing management for a community of energy buildings," International Journal of Electrical Power & Energy Systems, vol. 123, pp. 106204, 2020.

[17] M. Song, C. Gao, S. Ma, et al., "Distributed scheduling of HVACs based on transactive energy and ADMM," Applied Energy, vol. 325, pp. 119831, 2022.

[18] J. Wu, J. Hu, X. Ai, et al., "Multi-time scale energy management of electric vehicle model-based prosumers by using virtual battery model," Applied Energy, vol. 251, pp. 113312, 2019.

[19] J. Li, G. D. Xu, J. Wang, et al., "P2P multigrade energy trading for heterogeneous distributed energy resources and flexible demand," IEEE Trans. on Smart Grid, vol. 14, pp. 1577-1589, 2023.

[20] T. Morstyn and M. McCulloch, "Multiclass energy management for Peer-to-Peer energy trading driven by prosumer preferences," IEEE Trans. on Power Systems, vol. 34, pp. 4005-4014, 2019.

SUMMARY OF THE INVENTION

Aiming at the shortcomings of the existing technology, the invention discloses a real-time peer-to-peer energy trading method considering time-varying virtual energy storage, this method fully considers the time-varying characteristics of the time-varying virtual energy storage system and maximizes the economic benefits of prosumers under the premise of fully guaranteeing the trading preferences of prosumers. For the whole microgrid system, the complementary potential of energy resources can be fully utilized to promote the balance of supply and demand in the system, and further promote the local consumption of renewable energy resources, and enhance the overall economic benefits.

The technical solution of the invention to solve the above technical problems is as follows: A real-time peer-to-peer energy trading method considering time-varying virtual energy storage, predicting environmental information in a prediction time domain, and integrating historical transaction data into a time-varying virtual energy storage modeling and a real-time peer-to-peer energy trading;

in a quantitative extraction stage of supply and demand energy, extracting supply and demand energy and a marginal cost that a prosumer can use for trading quantitatively by using an autonomous energy management model for prosumers; in a transaction price optimization stage, optimizing a price that can be used for a transaction according to the historical transaction data to maximize an income of the prosumers themselves; using a distributed transaction decision optimization method based on continuous double auction to optimize a transaction matching decision of the prosumers to maximize the income of the prosumers and consider a multi-transaction preference level demand of the prosumers.

Furthermore, the environmental information in the time domain comprises light intensity, indoor and outdoor temperature, and market clearing price.

Furthermore, a method of the time-varying virtual energy storage modeling is as follows:

when a heating power of temperature control equipment is equal to a heat dissipation power, an indoor temperature will maintain a set temperature unchanged, and defining the heating power that maintains the indoor temperature as the set temperature as a reference heating power, it is shown in the following formulas:

$$Q_{i,t}^{TEMP} - Q_{i,t}^{HD} = C^{Air}\rho^{Air}V_i^{Air}(T_{in,t+1} - T_{in,t}) \quad (1)$$

$$Q_{i,t}^{Base} - Q_{i,t}^{HD} = \alpha^{HD}S_i^{HD}(T_{out,t} - T_{in,t}) \quad (2)$$

where $Q_{i,t}^{TEMP}$ is a heating power of the temperature control equipment of a prosumer i in a time t; $Q_{i,t}^{HD}$ is a heat dissipation power of a building envelope structure of the prosumer i in the time t; $C^{Air}$ is a specific heat capacity of air; $\rho^{Air}$ is an air density; $V_i^{Air}$ is an air capacity in a building of the prosumer i; $T_{in,t+1}$ and $T_{in,t}$ are indoor temperatures of the time t+1 and the time t respectively; $Q_{i,t}^{Base}$ is a reference heating power of the prosumer i in the time t; $\alpha^{HD}$ is a heat transfer coefficient of the building envelope structure; $S_i^{HD}$ is an area of the building envelope structure of the prosumer i; $(T_{out,t} - T_{in,t})$ is a temperature difference between indoor and outdoor; $T_{out,t}$ is an outdoor temperature of the time t;

a reference power consumption corresponding to a reference heating power of the temperature control equipment is shown as follows:

$$P_{i,t}^{Base} = P_{i,t}^{HD} = \frac{Q_{i,t}^{Base}}{R^{TEMP}}; \quad (3)$$

when a power consumption of the temperature control equipment is equal to the reference power consumption, the temperature will remain unchanged; when the power consumption of the temperature control equipment is greater than the reference power consumption, a virtual energy storage is in a charging state; when the power consumption of the temperature control equipment is less than the reference power consumption, the virtual energy storage is in an energy supply state, as shown in the following formula:

$$P_{i,t}^{VESS} = \begin{cases} P_{i,t}^{TEMP} - P_{i,t}^{Base} > 0, & \text{Charging} \\ P_{i,t}^{TEMP} - P_{i,t}^{Base} < 0, & \text{Discharging} \end{cases}; \quad (4)$$

where $P_{i,t}^{VESS}$ is a charging power of a virtual energy storage system of the prosumer i in the time t; $P_{i,t}^{TEMP}$ is a power consumption of the temperature control equipment of the prosumer i in the time t; $P_{i,t}^{Base}$ is the reference power consumption of the prosumer i in the time t; $P_{i,t}^{HD}$ is a heat dissipation power of a building of the prosumer i in time t; $R^{TEMP}$ is an energy efficiency ratio of the temperature control equipment;

calculating a state of charge of the virtual energy storage of the building, where a range of the state of charge of the virtual energy storage of the building is 0-1, a calculation of the state of charge of the virtual energy storage of the building is as follows:

$$W_{i,t}^{VESS} = \int_{t_i}^{t+\Delta\tau^x} P_{i,t}^{HD} dt; \tag{5}$$

$$\Delta\tau^W = \frac{\ln[T_{in,min} - T_{out,i}] - \ln[T_{in,max} - T_{out,i}]}{-\sum_{n=1}^{N} S_{i,n} \alpha^{HD}/C^{Air}} \tag{6}$$

$$SOC_{i,j}^{VESS} = \frac{E_{i,j}^{VESS}}{W_{i,j}^{VESS}}; \tag{7}$$

where $E_{i,t}^{VESS}$ is an energy value of the virtual energy storage of the building of the prosumer i in the time t; $W_{i,t}^{VESS}$ is a capacity of the virtual energy storage of the building for the prosumer i; $E_{i,max}^{VESS}$ mas is a maximum energy value of the virtual energy storage of the building of the prosumer i, and at this time the indoor temperature is $T_{max}$; $SOC_{i,t}^{VESS}$ is a state of charge of the virtual energy storage of the building of the prosumer i in the time t; $\Delta\tau^W$ is a heat dissipation time of the building; $S_{i,n}$ is a single wall area of the building; N is a number of building walls.

Furthermore, in the quantitative extraction stage of supply and demand energy, an objective function of an energy management model for prosumers is as follows:

$$\min f_i = C_i^{ES} - M_i^{P2P} + C_i^{Grid} \tag{8}.$$

where $f_i$ is a total cost of the prosumer i; $C_i^{Grid}$ is a cost of purchasing electricity for the power grid of the prosumer i; $C_i^{ES}$ is a scheduling cost of energy storage resources for the prosumer i; $M_i^{P2P}$ is an expected return of a peer-to-peer energy trading for the prosumer i;

$$C_i^{Grid} = \sum_{t=t_0}^{t_0+d} P_{i,t}^{Grid} c_i^{Grid} \Delta t \tag{9}$$

$$c_i^{Grid} = \begin{cases} -c_i^{Grid,feedin} & P_{i,t}^{Grid} > 0 \\ -c_i^{Grid,retail} & \text{otherwise} \end{cases}; \tag{10}$$

and $C_t^{Grid,feeding}$ where $C_t^{Grid,retail}$ are an on-grid price and a selling price of electricity purchased from the power grid in the time t respectively; $p_{i,t}^{Grid}$ is a purchasing and selling power of from the power grid by the prosumer i during the time t, a value of $p_{i,t}^{Grid}$ is positive, indicating that the prosumer sells electricity to the power grid, and the value of $p_{i,t}^{Grid}$ is negative, indicating that the prosumer purchases electricity from the power grid;

$$C_i^{ES} = \sum_{i=i_0}^{i_0+d} [|P_{i,t}^{ba,chg} - P_{i,t}^{ba,dischg}|c_i^{ba} + |P_{i,t}^{EV,chg} - P_{i,t}^{EV,dischg}|c_i^{EV}]\Delta t; \tag{11}$$

where $C_i^{ES}$ is a scheduling cost of energy storage resources of the prosumer $c_i^{ba}$, is a marginal scheduling cost of the battery; $C_i^{EV}$ is a marginal scheduling cost of a battery; the prosumer i in the time t; $P_{i,t}^{ba,chg}$ and $P_{i,t}^{ba,dischg}$ are a charging power and a discharging power of energy storage battery of the prosumer i in the time t, $P_{i,t}^{EV,chg}$ and $P_{i,t}^{EV,dischg}$ are a charging power and a discharging power of electric vehicle of the prosumer i in the time t; the value is positive, indicating charging; the value is negative, indicating discharging; calculating an expected cost of peer-to-peer energy trading in the time $t > t_0$ in the scheduling time T as follows:

$$M_i^{P2P} = \sum_{i=i_0}^{i_0+d} P_{i,t}^{P2P} c_t^{P2P} \Delta t \tag{12}$$

$$c_t^{P2P} = \begin{cases} c_i^{MCP} & t > t_0 \\ 0 & \text{otherwise} \end{cases}; \tag{13}$$

where $P_{i,t}^{P2P}$ is a virtual flexibility resource transaction power for the prosumer i, the value of $P_{i,t}^{P2P}$ is positive, indicating selling electricity, and the value of $P_{i,t}^{P2P}$ is negative, indicating purchasing electricity; $c_{i,t}^{MCP}$ is a predicted value of a market clearing price at time t; $M_{i,t}^{P2P}$ is an expected cost of the transaction; $c_t^{P2P}$ is a unit power transaction cost of the prosumer i at the time t.

Furthermore, based on the energy management model, using a marginal price analysis method to quantitatively extract a supply and demand capacity of the prosumers in the time $t_0$, by calculating a cost of energy production and utilization $f_i^{min}(P_{i,t_0}^{trade})$, differentiating the power of supply and demand $P_{i,t_0}^{trade} \in [P_{i,t_0}^{trade,min}, P_{i,t_0}^{trade,max}]$ in a $\delta$ step, and integrating an obtained marginal cost or utility to obtain a marginal cost/utility curve with piecewise characteristics;

assuming that a marginal cost curve consists of L segments, each segment contains energy supply information $s_{i,t_0,l}^{P2P,supply}$ for transaction price optimization and transaction execution, comprising a marginal cost $mc_{i,t_0,l}$ and supply power $P_{i,t_0,l}^{P2P,supply}$, obtaining a supply energy in the energy supply information of the lth segment by a lower boundary ($P_{i,t_0,l}^{cost}, P_{i,t_0,l-1}^{cost}$) of the lth segment and the 1-lth segment, as shown in the following formula, obtaining the marginal cost of the energy supply information in the lth segment by differential calculation:

$$P_{i,t_0,l}^{P2P,supply} = P_{i,t_0,l}^{cost} - P_{i,t_0,l-1}^{cost} \tag{14}$$

assuming a marginal utility curve is composed of K segments, an acquisition method for energy demand information of the kth segment is the same as capacity supply information, a calculation method for the demand energy is as follows:

$$P_{i,t_0,k}^{P2P,demand} = P_{i,t_0,k}^{utility} - P_{i,t_0,k-1}^{P2P,utility} \tag{15}$$

Furthermore, in the transaction price optimization stage, based on the marginal cost/utility and transaction probability obtained in the quantitative extraction stage of supply and demand energy, obtaining an optimal price that can be used for transaction execution, optimizing a price of the energy supply and demand obtained in the previous stage by the prosumer i to maximize its own economic benefits, a bidding optimization model of the first energy supply and a bidding optimization model of the kth energy demand are as follows:

$$\pi_{i,l}^{sell} = \max_{a_{i,l}^{buy} \in (ob,oa)} [(a_{i,l}^{sell} - mc_{i,l}) \cdot p(a_{i,l}^{sell})] \tag{16}$$

-continued
$$\pi_{i,k}^{buy} = \max_{b_{i,k}^{buy} \in (ob,oa)} [(mu_{i,k} - b_{i,k}^{buy}) \cdot q(b_{i,k}^{buy})]; \quad (17)$$

where $a_{i,l}^{sell}$ is a transaction quote for an energy supply l, $b_{i,k}^{buy}$ is a transaction bid for an energy demand k; $p(a_{i,l}^{sell})$ and $q(b_{i,k}^{buy})$ are the transaction probabilities for the sell energy supply l and the energy demand k respectively; $\pi_{i,l}^{sell}$ is an electricity sales revenue for the energy supply l; $\pi_{i,k}^{buy}$ is a purchase cost of electricity for the energy demand k; $mc_{i,l}$ is a marginal cost of the energy supply l; $mu_{i,k}$ is a marginal utility of the energy demand k; (ob, oa) are upper and lower limits of the transaction price.

Furthermore, a method for an optimization algorithm is as follows:

using a transaction decision optimization method based on continuous double auction to deal with the electricity purchasing and selling capacity comprising transaction price and electricity quantity by the prosumer, firstly, integrating the optimized transaction price and supply and demand electricity quantity into transaction announcement information that can be used to interact with other prosumers, comprising the energy supply information $s_i^{sell} = \{s_{i,1}^{sell}, s_{i,2}^{sell}, \ldots, s_{i,l}^{sell}\}$ and the energy demand information $D_i^{buy} = \{d_{i,1}^{buy}, d_{i,2}^{buy}, \ldots, d_{i,k}^{buy}\}$.

Then, selecting information representing a specific energy resource in notification information and sending the information to other prosumers with a preference level m, dividing tradeable prosumers into multiple preference levels $I_{i,l} = \{I_{i,l}^m, I_{i,l}^{m-1}, I_{i,l}^{m-2}, \ldots, I_{i,l}^l\}$; after that, matching the prosumer with the preference level m to maximize their own income;

finally, recording the information of transaction success or failure in a historical transaction information set, in which the prosumer who fails in the transaction will re-price an optimal transaction price of the transaction probability in a next transaction round according to an updated historical transaction information set, re-formulate the transaction announcement information and initiate the transaction; if an adjusted transaction price does not change, indicating that the prosumers of the preference level m cannot be matched at this time, selecting prosumers of a next preference level m-1 for trading until the trading market is completely cleared.

The beneficial effects of the invention are as follows:

The invention proposes a real-time peer-to-peer energy trading method considering time-varying virtual energy storage. A time-varying virtual energy storage model for power storage is constructed and integrated into the autonomous energy management of prosumers, a model of the virtual energy storage of the building system is built accurately to further improve the accuracy of quantifying building energy flexibility; a two-stage real-time trading method based on model predictive control is proposed, while considering the uncertainty of renewable energy, the time-varying characteristics of time-varying virtual energy storage system can be fully considered, which ensures the comfort of prosumers of the building to a certain extent and improves the economic benefits of prosumers, the indoor temperature setting range of prosumers can directly determine the capacity of virtual energy storage, the maximum adjustment potential provided by virtual energy storage can be selected by adjusting the indoor temperature setting range, so as to improve the flexible allocation space of the resources of the prosumers; a distributed peer-to-peer energy trading decision optimization method based on continuous double auction is proposed, the method maximizes the economic benefits of the prosumers under the premise of fully guaranteeing the trading preferences of the prosumers. Finally, it is verified by simulation that the virtual energy storage of the prosumer building will change its charging and discharging behaviors with the lowest cost as the goal, and further affect the energy consumption scheme of other energy resources of the prosumer; then, this method can fully tap the adjustable potential of the energy resources of prosumers, and change their energy production and utilization habits in the way of optimal economic benefits of prosumers, so as to further promote the utilization efficiency of their resources; for the micro-grid system as a whole, the complementary potential of energy resources can be fully utilized to promote the balance of supply and demand in the system, while reducing the energy exchange level between the micro-grid and the power grid, alleviating the problem of excessive load on the tie line between the micro-grid and the power grid, reducing the peak power and the peak-valley difference of the micro-grid power, and further promoting the local consumption of renewable energy resources and improving the global economic benefits.

DETAILED DESCRIPTION OF THE EMBODIMENTS

Figure 1A:
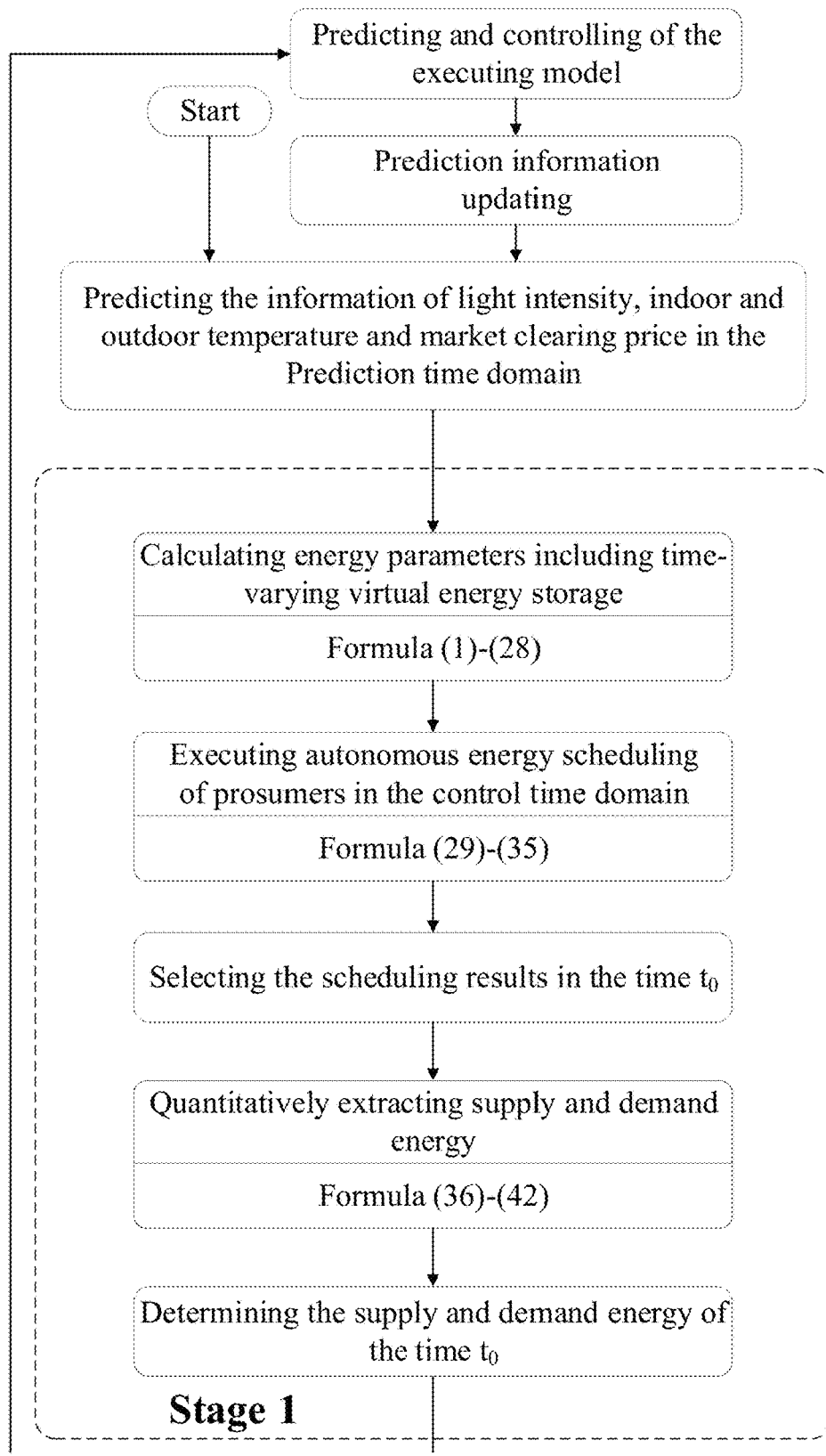
FIG. 1A is an algorithm flow chart.

A specific implementation method of the invention is described in detail below. The invention can be implemented in many other ways that are different from those described herein, technicians in the field can make similar improvements without violating the connotation of the invention, so the invention is not limited by the disclosed embodiments.

Unless otherwise defined, all technical and scientific terms used in this invention have the same meaning as those commonly understood by technicians in the technical field to which the invention belongs, the terms used in this invention are only to describe the specific implementation method, not to limit the invention.

A real-time peer-to-peer energy trading method considering time-varying virtual energy storage, comprising the following steps: the environmental information (light intensity, indoor and outdoor temperature, and market clearing price) in a prediction time domain are predicted and the historical transaction data is integrated into the time-varying virtual energy storage modeling and the real-time peer-to-peer energy trading.

In the quantitative extraction stage of supply and demand energy, the supply and demand energy and the marginal cost that the prosumer can use for trading are extracted quantitatively by using the autonomous energy management model for prosumers. In the transaction price optimization stage, the price that can be used for the transaction is optimized according to the historical transaction data to maximize the income of the prosumers themselves; the distributed transaction decision optimization method based on continuous double auction is used to optimize the transaction matching decision of the prosumers to maximize the income of the prosumers and consider a multi-transaction preference level demand of the prosumers.

The invention will construct a time-varying virtual energy storage model of prosumer buildings based on the heat storage characteristics of buildings, and provide a model basis for real-time peer-to-peer energy trading. Time-varying virtual energy storage is to adjust the indoor temperature of the building within a certain temperature range according to the energy demand of the prosumers by coordinating the heating power of the temperature control equipment, so as to show the charging and discharging characteristics similar to the battery. According to the heat balance equation, when the heating power of temperature control equipment is equal to the heat dissipation power, the indoor temperature will maintain a set temperature unchanged, and the heating power that maintains the indoor temperature is defined as the set temperature as a reference heating power, it is shown in the following formulas:

$$Q_{i,t}^{TEMP} - Q_{i,t}^{HD} = C^{Air}\rho^{Air}V_i^{Air}(T_{in,t+1} - T_{in,t}) \quad (1)$$

$$Q_{i,t}^{Base} - Q_{i,t}^{HD} = \alpha^{HD}S_i^{HD}(T_{out,t} - T_{in,t}) \quad (2)$$

where $Q_{i,t}^{TEMP}$ is a heating power of the temperature control equipment of the where prosumer i in the time t; $Q_{i,t}^{HD}$ is a heat dissipation power of the building envelope structure of the prosumer i in the time t; $C^{Air}$ is a specific heat capacity of air; $\rho^{Air}$ is an air density; $V_i^{Air}$ is an air capacity in the building of the prosumer i; $T_{in,t+1}$ and $T_{in,t}$ are indoor temperatures of the time t+1 and the time t respectively; $Q_{i,t}^{Base}$ is a reference heating power of the prosumer i in the time t; $\alpha^{HD}$ is a heat transfer coefficient of the building envelope structure; $S_i^{HD}$ is an area of the building envelope structure of the prosumer i;

($T_{out,t}$–Time$_{in,t}$) is a temperature difference between indoor and outdoor; $T^{out,t}$ is an outdoor temperature of the time t;

so a reference power consumption corresponding to a reference heating power of the temperature control equipment is shown as follows:

$$P_{i,t}^{Base} - P_{i,t}^{HD} = \frac{Q_{i,t}^{Base}}{R^{TEMP}}; \quad (3)$$

when the power consumption of the temperature control equipment is equal to the reference power consumption, the temperature will remain unchanged; when the power consumption of the temperature control equipment is greater than the reference power consumption, the virtual energy storage is in the charging state; when the power consumption of the temperature control equipment is less than the reference power consumption, the virtual energy storage is in the energy supply state, as shown in the following formula:

$$p_{i,t}^{VESS} = \begin{cases} P_{i,t}^{TEMP} - P_{i,t}^{Base} > 0, & \text{Charging} \\ P_{i,t}^{TEMP} - P_{i,t}^{Base} < 0, & \text{Discharging} \end{cases}; \quad (4)$$

where $P_{i,t}^{VESS}$ is a charging power of the virtual energy storage system of the prosumer i in the time t; $P_{i,t}^{TEMP}$ is the power consumption of the temperature control equipment of the prosumer i in the time t; $P_{i,t}^{Base}$ is the reference power consumption of the prosumer i in the time t; $P_{i,t}^{HD}$ is a heat dissipation power of the building of the prosumer i in time t; $R^{TEMP}$ is an energy efficiency ratio of the temperature control equipment; combined with the building heat balance equation shown above, the energy value of virtual energy storage can be obtained. By calculating the ratio of its energy value to capacity (the virtual energy storage capacity is equal to the maximum energy value), the state of charge of the virtual energy storage can be obtained, which ranges from 0 to 1, as shown in the following formulas:

$$W_{i,t}^{VESS} = \int_t^{t+\Delta\tau^W} P_{i,t}^{HD}dt; \quad (5)$$

$$\Delta\tau^W = \frac{\ln[T_{in,min} - T_{out,i}] - \ln[T_{in,max} - T_{out,i}]}{-\sum_{n=1}^{N}S_{i,n}\alpha^{HD}/C^{Ac}} \quad (6)$$

$$SOC_{i,i}^{VESS} = \frac{E_{i,i}^{VESS}}{W_{i,i}^{VESS}}; \quad (7)$$

where $E_{i,t}^{VESS}$ is an energy value of the virtual energy storage of the building of the prosumer i in the time t; $W_{i,t}^{VESS}$ is a capacity of the virtual energy storage of the building for the prosumer i; $E_{i,max}^{VESS}$ is a maximum energy value of the virtual energy storage of the building of the prosumer i, and at this time the indoor temperature is $T_{max}$; $SOC_{i,t}^{VESS}$ is a state of charge of the virtual energy storage of the building of the prosumer i in the time t; $\Delta\tau^W$ is a heat dissipation time of the building; $S_{i,n}$ is a single wall area of the building; N is a number of building walls.

In order to fully consider the time-varying characteristics of the time-varying virtual energy storage system, the prosumer will adopt a real-time energy trading method based on model predictive control, which comprises two parts: the quantitative extraction of supply and demand capacity and the pricing strategy of the prosumer. The invention will first propose the autonomous energy management model for prosumers with the goal of the optimal economy, and on this basis, the marginal price analysis method will be used to quantitatively extract the electricity sales resources and electricity purchase demand that can be used for trading; then, according to the collected historical transaction information, the transaction probability of the market historical price is solved, and the transaction price of the prosumer is determined with the goal of maximizing the expected return, the final obtained quantitative power and price will be used in the peer-to-peer energy trading implementation process.

In the quantitative extraction stage of supply and demand energy, the objective function of the energy management model for prosumers is as follows:

$$\min f_i = C_i^{ES} - M_i^{P2P} + C_i^{Grid} \quad (8)$$

where $f_i$ is a total cost of the prosumer; $C_i^{Grid}$ is a cost of purchasing electricity for the power grid of the prosumer $C_i^{ES}$; is a scheduling cost of energy storage resources for the prosumer i; $M_i^{P2P}$ is an expected return of a peer-to-peer energy trading for the prosumer i; prosumer i;

$$C_i^{Grid} = \sum_{t=t_0}^{t_0+d} P_{i,t}^{Grid} c_t^{Grid} \Delta t \quad (9)$$

$$c_i^{Grid} = \begin{cases} -c_i^{Grid,feedin} & P_{i,t}^{Grid} > 0 \\ -c_i^{Grid,retail} & \text{otherwise} \end{cases} ; \quad (10)$$

where $C_t^{Grid,feedin}$ and $C_t^{Grid,retail}$ are an on-grid price and a selling price of Grid,retail electricity purchased from the power grid in the time t respectively; $P_{i,t}^{Grid}$ is a purchasing and selling power of from the power grid by the prosumer i during the time t, a value of $P_{i,t}^{Grid}$ is positive, indicating that the prosumer sells electricity to the power grid, and the value of $P_{i,t}^{Grid}$ is negative, indicating that the prosumer purchases electricity from the power grid;

$$C_i^{ES} = \sum_{i=i_0}^{i_0+d} [|P_{i,t}^{ba,chg} - P_{i,t}^{ba,dischg}|c_i^{ba} + |P_{i,t}^{EV,chg} - P_{i,t}^{EV,dischg}|c_i^{EV}] \Delta t; \quad (11)$$

where $C_i^{ES}$ is a scheduling cost of energy storage resources of the prosumer i, $c_i^{ba}$ is a marginal scheduling cost of the battery; $c_i^{EV}$ is a marginal scheduling cost of the battery for the prosumer i in the time t; $P_{i,t}^{ba,chg}$ and $P_{i,t}^{ba,dishg}$ a charging power and a discharging power of energy storage battery of the prosumer i in the time t, $P_{i,t}^{ba,chg}$ and $P_{i,t}^{ba,dishg}$ are a charging power and a discharging power of electric vehicle of the prosumer i in the time t; the value is positive, indicating charging; the value is negative, indicating discharging;

In order to accurately quantify the supply and demand potential of peer-to-peer energy trading of prosumers in the time $t_0$, the invention will consider the expected cost of peer-to-peer energy trading in the time $t>t_0$ in the scheduling time T.

$$M_i^{P2P} = \sum_{i=i_0}^{i_0+d} P_{i,t}^{P2P} c_t^{P2P} \Delta t \quad (12)$$

$$c_i^{P2P} = \begin{cases} c_i^{MCP} & t > t_0 \\ 0 & \text{otherwise} \end{cases}; \quad (13)$$

where $P_{i,t}^{P2P}$ is a virtual flexibility resource transaction power for the prosumer i, the value of $P_{i,t}^{P2P}$ is positive, indicating selling electricity, and the value of $P_{i,t}^{P2P}$ is negative, indicating purchasing electricity; $c_i^{MCP}$ is a predicted value of a market clearing price at time t; $M_i^{P2P}$ is an expected cost of the transaction; $c_t^{P2P}$ is a unit power transaction cost of time t; the prosumer i at the time t.

Based on the energy management model, the marginal price analysis method is used to quantitatively extract the supply and demand capacity of the prosumers in the time $t_0$, by calculating the cost of energy production and utilization $f_i^{min}(P_{i,t_0}^{trade})$, the power of, supply and demand $P_{i,t_0}^{trade} \in [P_{i,t_0}^{trade,min}, P_{i,t_0}^{trade,max}]$ is differentiated in the $\delta$ step, and the obtained marginal cost or utility is integrated to obtain the marginal cost/utility curve with piecewise characteristics;

It is assumed that a marginal cost curve consists of L segments, each segment contains energy supply information $s_{i,t_0,l}^{P2P,supply}$ for transaction price optimization and transaction execution, comprising a marginal cost $mc_{i,t_0,l}$ and supply power $P_{i,t_0,l}^{P2P,supply}$, the supply energy in the energy supply information of the lth segment is obtained by the lower boundary $(P_{i,t_0,l}^{cost}, P_{i,t_0,l-1}^{cost})$ of the lth segment and the l-lth segment, as shown in the following formula, the marginal cost of the energy supply information in lth segment is obtained by differential calculation:

$$P_{i,t_0,l}^{P2P,supply} = P_{i,t_0,l}^{cost} - P_{i,t_0,l-1}^{cost} \quad (14)$$

It is assumed that the marginal utility curve is composed of K segments, the acquisition method for energy demand information of the kth segment is the same as capacity supply information, and the calculation method for the demand energy is as follows:

$$P_{i,t_0,k}^{P2P,demand} = P_{i,t_0,k-1}^{utility} - P_{i,t_0,k}^{P2P,supply} \quad (15)$$

in the transaction price optimization stage, based on the marginal cost/utility and transaction probability obtained in the quantitative extraction stage of supply and demand energy, the optimal price that can be used for transaction execution is obtained. The price of the energy supply and demand obtained in the previous stage is optimized by the prosumer i to maximize its own economic benefits. the bidding optimization model of the first energy supply and the bidding optimization model of the kth energy demand are as follows:

$$\pi_{i,l}^{sell} = \max_{a_{i,l}^{buy} \in (ob,oa)} [(a_{i,l}^{sell} - mc_{i,l}) \cdot p(a_{i,l}^{sell})] \quad (16)$$

$$\pi_{i,k}^{buy} = \max_{b_{i,k}^{buy} \in (ob,oa)} [(mu_{i,k} - b_{i,k}^{buy}) \cdot q(b_{i,k}^{buy})]; \quad (17)$$

where $a_{i,l}^{sell}$ is a transaction quote for the energy supply l, $b_{i,k}^{buy}$ is a transaction bid for the energy demand k; $p(a_{i,l}^{sell})$ and $q(b_{i,k}^{buy})$ are the transaction probabilities for the energy supply l and the energy demand k respectively; $\pi_{i,l}^{sell}$ is an electricity sales revenue for the energy supply l; $\pi_{i,k}^{buy}$ is a purchase cost of electricity for the energy demand k; $mc_{i,l}$ is a marginal cost of the energy supply l; $mu_{i,k}$ is a marginal utility of the energy demand k; (ob, oa) are upper and lower limits of the transaction price.

The prosumers will use the transaction decision optimization method based on continuous double auction to deal with the electricity purchasing and selling capacity comprising transaction price and electricity quantity, firstly, the optimized transaction price and supply and demand electricity quantity are integrated into transaction announcement information that can be used to interact with other prosumers, comprising the energy supply information $S_i^{sell} = \{s_{i,1}^{sell}, s_{i,2}^{sell}, \ldots, s_{i,l}^{sell}\}$ and the energy demand information $D_i^{buy} = \{d_{i,1}^{buy}, d_{i,2}^{buy}, \ldots, d_{i,k}^{buy}\}$, then, selecting information representing a specific energy resource in notification information are selected and sent to other prosumers with a preference level m, the tradeable prosumers are divided into multiple preference levels; $I_{i,\bar{t}} = \{I_{i,\bar{t}}^m, I_{i,\bar{t}}^{m-1}, I_{i,\bar{t}}^{m-2}, \ldots, I_{i,\bar{t}}^1\}$; after that, the prosumer is matched with the prosumer with the preference level m with the goal of maximizing their own income; finally, the information of transaction success or failure are recorded in the historical transaction information set, in which the prosumer who fails in the transaction will re-price the optimal transaction price of the transaction probability in the next transaction round according to the updated historical transaction information set, re-formulate the transaction announcement information and initiate the transaction; if the adjusted transaction price does not change, indicating that the prosumers of the preference level m cannot be matched at this time, the prosumers of the next preference level m-1 is selected for trading until the trading market is completely cleared.

The invention is further described in detail in combination with the attached figures and the specific implementation method in the following.

Figure 1B:
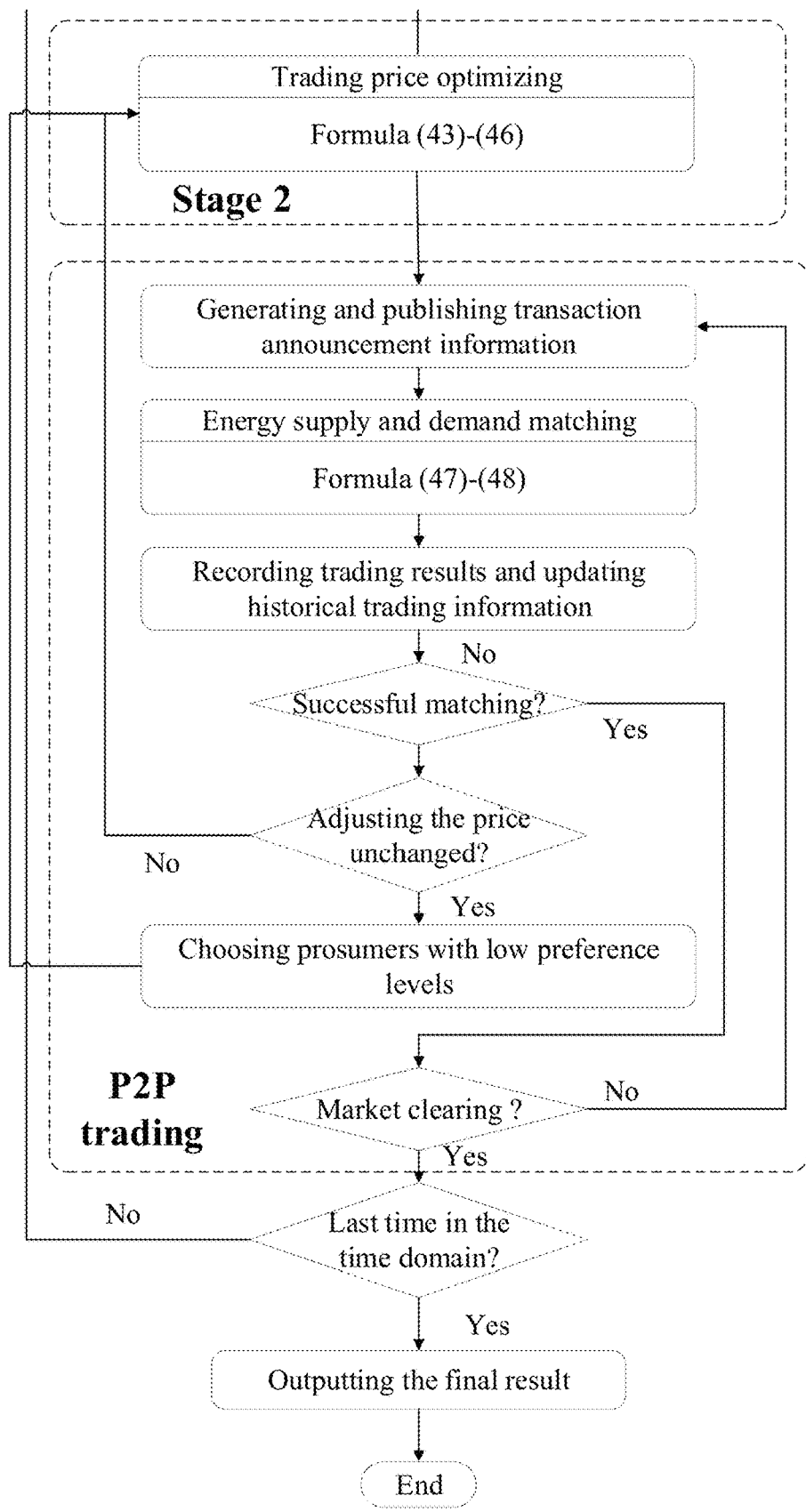
FIG. 1B is a continuation of an algorithm flow chart of FIG. 1A.

FIG. 1A and FIG. 1B are the flow chart of this method, the steps of this method are as follows:

The invention aims to make full use of the adjustable potential of prosumers' own resources and uses a real-time peer-to-peer energy trading method considering time-varying virtual energy storage to optimize and coordinate transactions between prosumers. To this end, the technical solution adopted in this invention is a real-time peer-to-peer energy trading method considering time-varying virtual energy storage, comprising the following steps: First, the environmental information (light intensity, indoor and outdoor temperature, and market clearing price) in a prediction time domain are predicted and the historical transaction data is integrated into the time-varying virtual energy storage modeling and the real-time peer-to-peer energy trading. Then, a two-stage real-time energy trading method is adopted, specifically, in the quantitative extraction stage of supply and demand energy, the supply and demand energy and the marginal cost that the prosumer can use for trading are extracted quantitatively by using the autonomous energy management model for prosumers. In the transaction price optimization stage, the price that can be used for the transaction is optimized according to the historical transaction data to maximize the income of the prosumers themselves. Finally, the distributed transaction decision optimization method based on continuous double auction is used to optimize the transaction matching decision of the prosumers to maximize the income of the prosumers and consider the multi-transaction preference level demand of the prosumers.

Figure 2A:
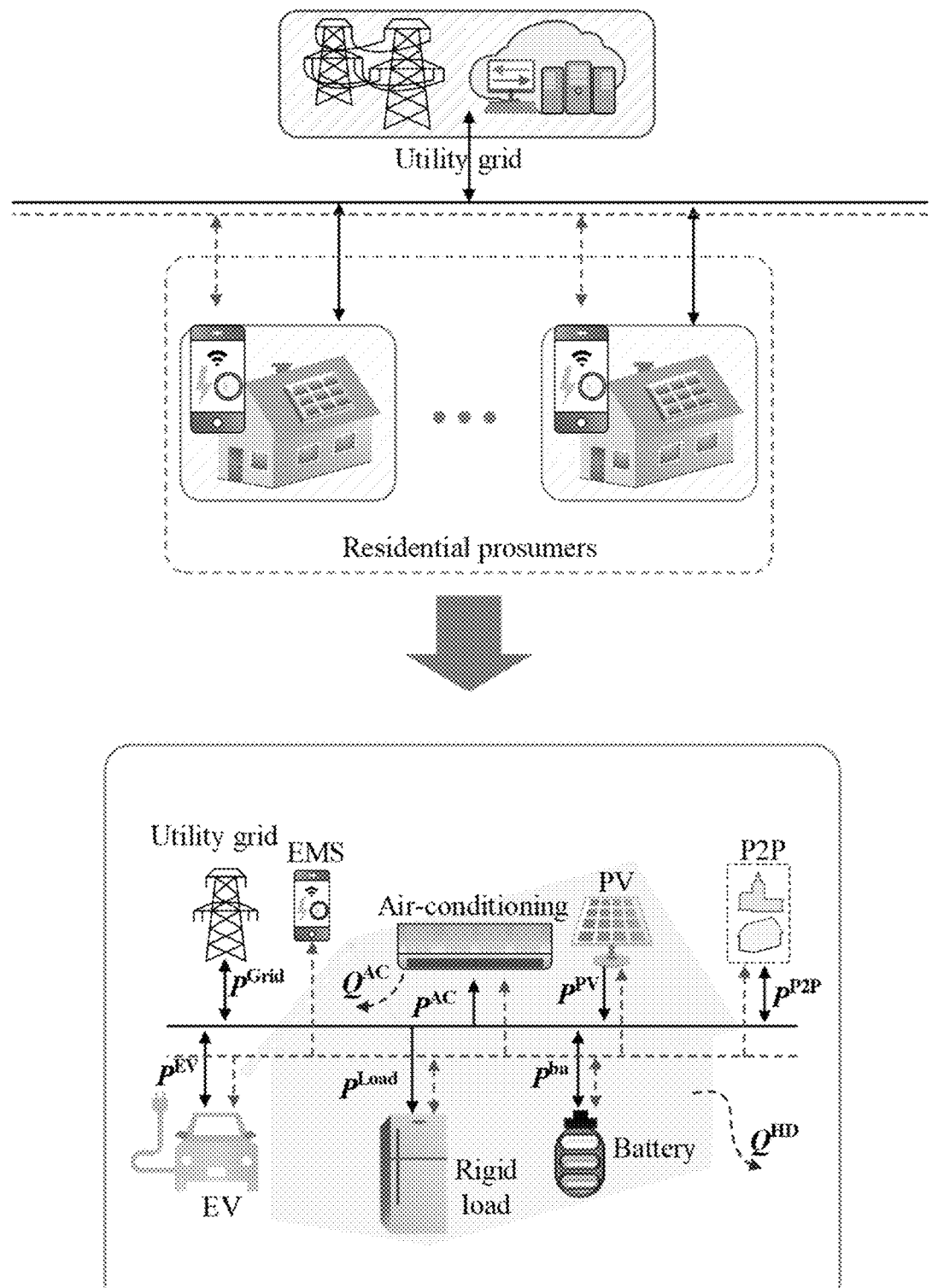
FIG. 2A is a peer-to-peer transaction diagram of the urban microgrid system.
Figure 2B:
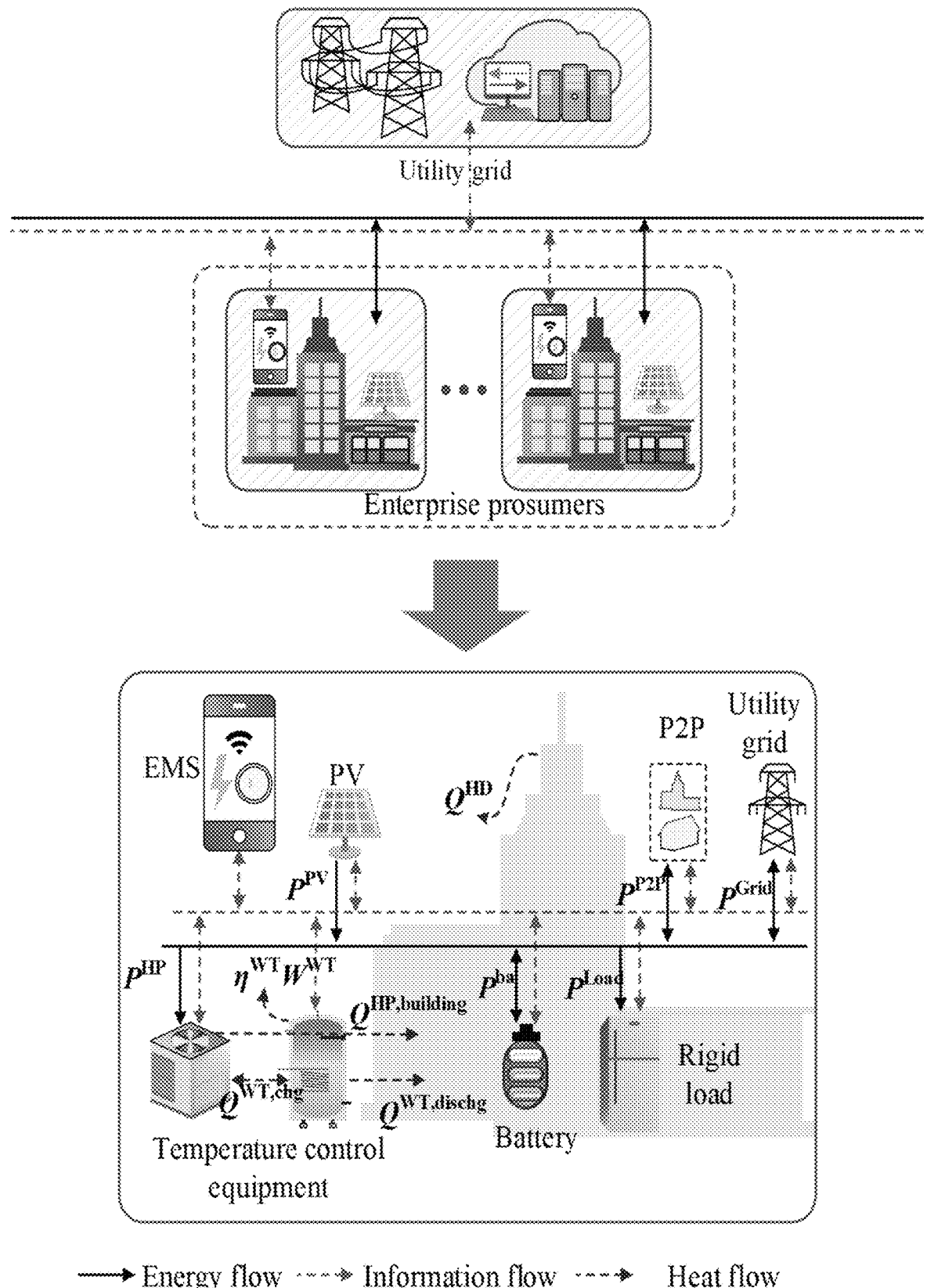
FIG. 2B is a continuation of a peer-to-peer transaction diagram of the urban microgrid system of FIG. 2A.

Taking the typical urban park shown in FIG. 2A and FIG. 2B as an example, the effectiveness of the peer-to-peer energy trading method considering time-varying virtual energy storage is verified. The urban park comprises residential and enterprise prosumers, where the residential prosumers comprise 90 family houses (#1-#90), and the enterprise prosumers comprise an industrial plant (#91) and three commercial buildings (#92-#94), the energy resource allocation and building parameters are shown in Table 1 and Table 2. The air density and air specific heat capacity are 1.2 kg/m3 and 1000 J (kg° C.).

TABLE 1

Energy resource allocation of prosumers

| Model parameter | | Residential prosumer (#1~#90) | Enterprise prosumer (#91) | Enterprise prosumer (#92~#94) |
|---|---|---|---|---|
| Rigid load | Electric power | 3 kW | 128 kW | 30 kW |
|  | Time interval | 18:00~24:00 | 8:00~18:00 | 8:00~18:00 |
| Pv generation | Peak power | 3 kW | 50 kW | 8 kW |
| Storage battery | Energy storage capacity | 13.5 kWh | 450 kWh | 60 kWh |
|  | Peak power | 3.5 kW | 50 kW | 15 kW |
|  | Cost per Wkh | 0.26 RMB/kWh | 0.19 RMB/kWh | 0.19 RMB/kWh |
| Electric vehicle | Battery capacity | 70 kWh | / | / |
|  | Peak power | 2 kW | / | / |
|  | Cost per kWh | 0.26 RMB/kWh | / | / |
| HVAC | Energy efficiency ratio | 2.3 | / | / |
|  | Peak power | 2 kW | / | / |
| Heat pump | Energy efficiency ratio | / | 4.12 | 4.12 |
|  | Peak power | / | 80 kW | 80 kW |
| Heat storage tank | Upper limit of stored heat | / | 1300 kWh | 800 kWh |
|  | Peak power supply | / | 176 kW | 106 kW |

TABLE 2

Building parameters of prosumers

| Model parameter | | Residential prosumer (#1~#90) | Enterprise prosumer (#91) | Enterprise prosumer (#92~#94) |
|---|---|---|---|---|
| Heat storage building | House area | 150 m² | 13000 m² | 8000 m² |
|  | House height | 2.8 m | 2.8 m | 2.8 m |
|  | Envelope structure area | 292 m² | 14277 m² | 8250 m² |

In order to facilitate the elaboration, the invention divides the 24 hours of the whole day into three typical periods, namely, the daytime working period (6:00-17:00), the nighttime living period (17:00-24:00), and the nighttime free period (0:00-6:00). residential and enterprise prosumers set the indoor temperature at 18° C. at all times of the day, after considering the virtual energy storage, the temperature setting range of the cooling period of the prosumer is 23° C.-25° C.

Figure 3:
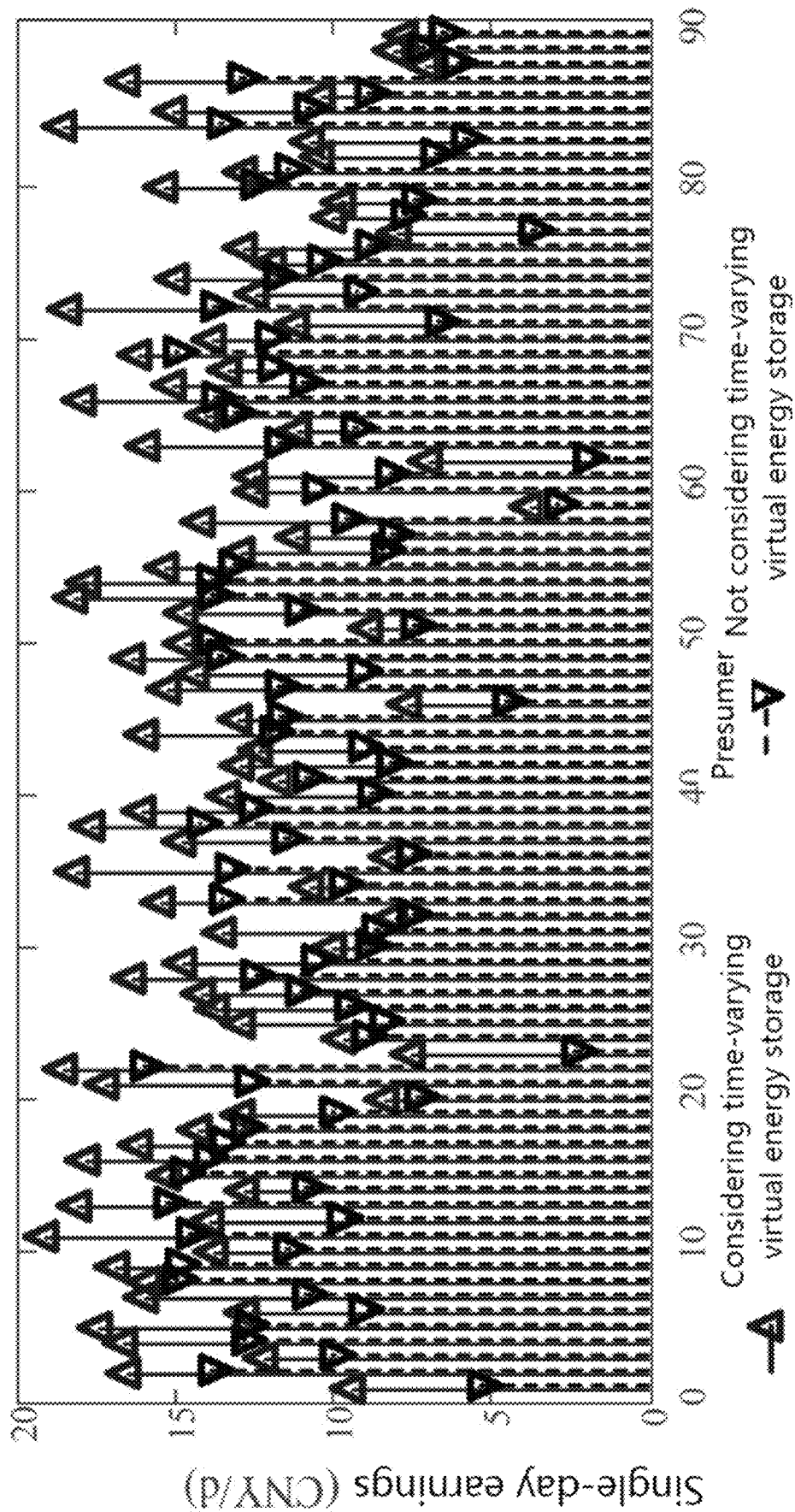
FIG. 3 is a cost-benefit diagram of the prosumers before and after considering time-varying virtual energy storage-residential prosumers' income.
Figure 4:
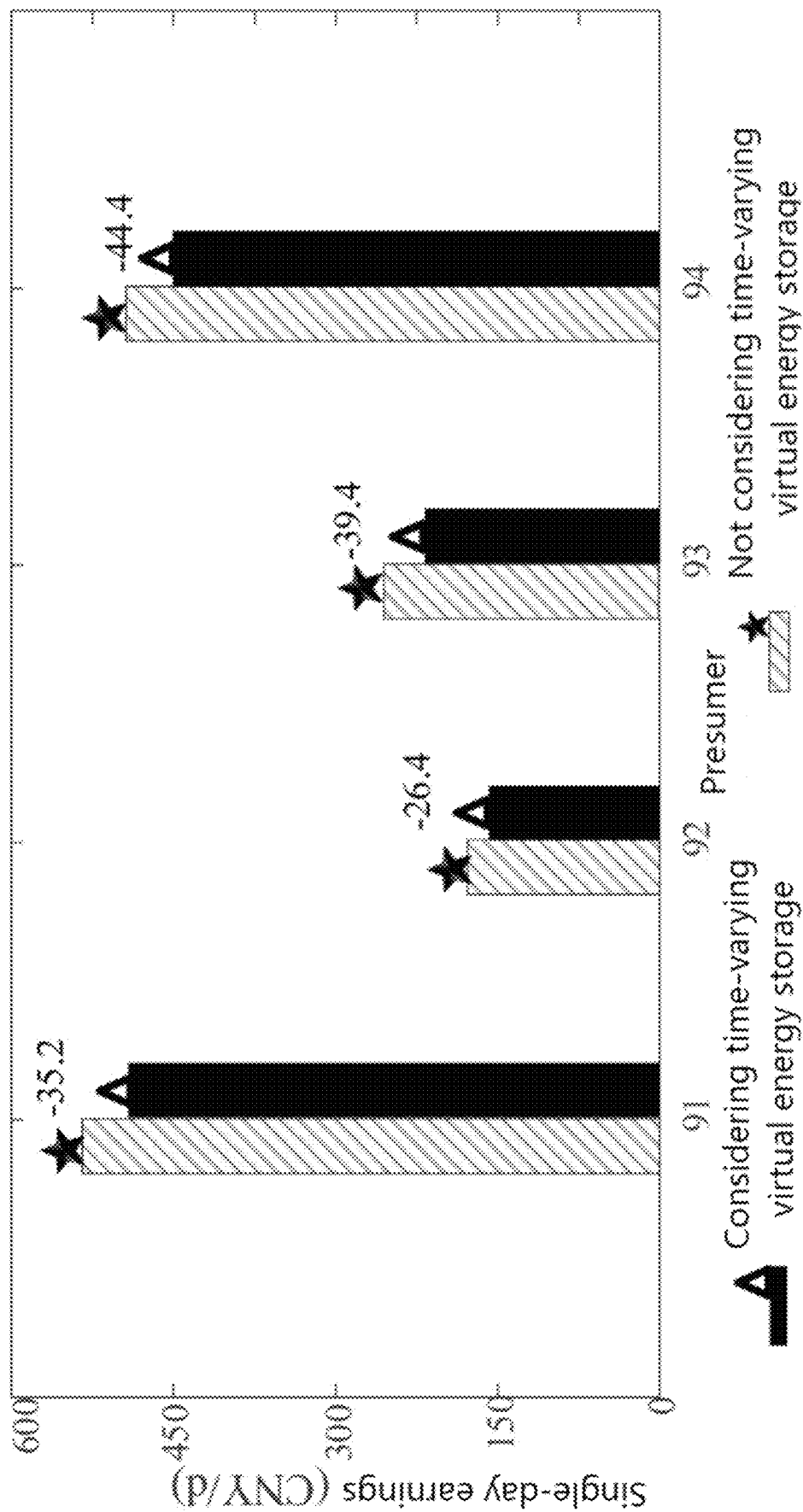
FIG. 4 is a cost-benefit diagram of the prosumers before and after considering time-varying virtual energy storage-enterprise prosumers' costs.

In the distributed peer-to-peer energy trading market, the energy production and consumption behavior of the prosumer group will change after considering the time-varying virtual energy storage, as shown in Table 3. During the daytime working period, the enterprise prosumers will purchase more redundant photovoltaics through peer-to-peer transactions with the residential prosumers to recharge the time-varying virtual energy storage, resulting in the residential prosumers will reduce the sales of electricity to the grid and the storage capacity of the energy storage battery; the enterprise prosumers will reduce their own energy storage battery discharge and purchase power from the grid by releasing the energy of time-varying virtual energy storage. During the nighttime living period, the residential prosumers will use time-varying virtual energy storage to 'arbitrage'. Specifically, the residential prosumers will purchase more energy storage battery capacity of enterprise prosumers with lower marginal cost when charging time-varying virtual energy storage, and reduce the discharge of energy storage batteries and electric vehicles using their own high marginal cost when supplying energy. In general, the peer-to-peer electricity sold by the residential prosumers increases from 1844.2 kWh to 1907.3 kWh, the electricity sold to the grid decreases from 235 kWh to 187.2 kWh, the charge and discharge of energy storage batteries decreases from 81 kWh to 65.7 kWh, and the discharge of electric vehicles decreases by 4.2 kWh, the peer-to-peer electricity sold by enterprise prosumers increases from 167 kWh to 230.1 kWh, and the purchase of electricity from the grid decreases from 754 kWh to 709 kWh, the charge and discharge capacity of the energy storage battery decreases from 513 kWh to 458.1 kWh. Therefore, after considering the time-varying virtual energy storage, the economic benefits of energy production and consumption of each prosumer are improved due to the reduction of the power purchase cost of the prosumer from the power grid and the charging and discharging cost of the energy storage, as shown in FIG. 3-FIG. 4. For example, the income of residential prosumer #1 increased from 5.33 RMB to 8.2 RMB, and the cost of enterprise prosumer #91 decreased from 532.3 RMB to 497.1 RMB.

TABLE 3

The change of application energy behavior of prosumers group prosumer

| | Parameter | Residential prosumer | Enterprise prosumer |
|---|---|---|---|
| Peer-to-peer transaction sales | Considering time-varying virtual energy storage | 1907.3 kWh | 230.1 kWh |
| | Not considering time-varying virtual energy storage | 1844.2 kWh | 167 kWh |
| Charge & discharge capacity of energy storage battery | Considering time-varying virtual energy storage | 81 kWh | 458.1 kWh |
| | Not considering time-varying virtual energy storage | 65.7 kWh | 513 kWh |
| Purchase and sale of electricity to the grid | Considering time-varying virtual energy storage | 187.2 kWh | 709 kWh |
| | Not considering time-varying virtual energy storage | 235 kWh | 754 kWh |

When the energy market reaches an equilibrium state, the residential prosumer group considering time-varying virtual energy storage will reduce the photovoltaic trading volume with the power grid, and increase the peer-to-peer trading volume with the enterprise prosumer group. Therefore, the power transmission from the microgrid system to the main network will decrease from 235.3 kWh to 177.8 kWh, and the local consumption level of renewable energy will increase from 85.07% to 88.75%. Since enterprise prosumers will reduce the energy storage capacity of the energy storage battery during nighttime living and free time, the energy exchange level between the microgrid and the power grid will be reduced, so that the peak power of the tie-line at night will be reduced from 189.1 kW to 178.8 kW, and the peak-valley difference will be reduced by 2.8%. In terms of energy economy, the overall energy cost of the microgrid is reduced from 564.3 RMB to 413.8 RMB.

In the distributed peer-to-peer energy trading market, the indoor temperature setting range of the buildings of the prosumers can directly determine the time-varying virtual energy storage capacity, which will affect the maximum adjustable potential provided by the time-varying virtual energy storage. The invention will further analyze the influence of the indoor temperature setting range of the buildings of the prosumers on the overall economy of the microgrid. The invention will take 23° C. as the lower limit of the temperature setting range, and change the temperature setting range by continuously raising the upper limit of the temperature, so as to increase the time-varying virtual energy storage capacity, the analysis of the impact of different temperature setting ranges on the global economy is shown in Table 5. It can be seen from Table 4 that the total cost of energy production and consumption of the microgrid system will decrease with the expansion of the temperature setting range. However, when the temperature is set to 23° C.-27° C., that is, the difference between the upper and lower limits of temperature is 4° C., the total cost of energy production and consumption is 371.5 RMB, which will basically no longer decline, indicating that the time-varying virtual energy storage capacity at this time can meet the needs of the optimal energy scheduling and maximum transaction income of the prosumers. If the temperature setting range continues to increase, the total cost of energy production will not change due to the excess capacity of time-varying virtual energy storage.

TABLE 4

Comparison of the total cost of prosumers in different temperature setting ranges

| Evaluating indicator | 23° C.-25° C. | 23° C.-26° C. | 23° C.-27° C. | 23° C.-28° C. | 23° C-29° C. |
|---|---|---|---|---|---|
| Total cost of energy production and consumption | 413.2 RMB | 392.1 RMB | 371.5 RMB | 371.6 RMB | 371.8 RMB |

Figure 5:
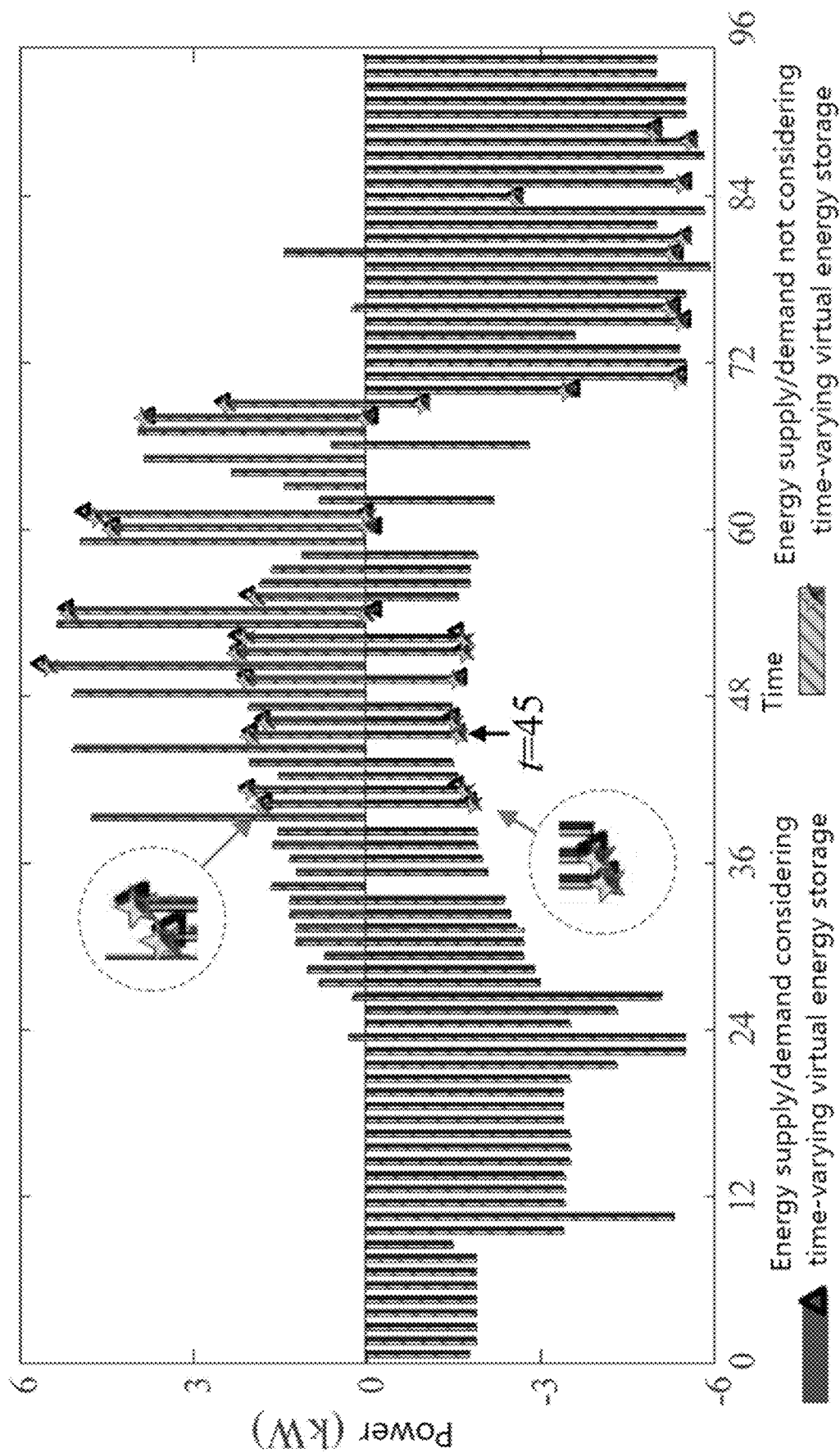
FIG. 5 is a supply and demand capacity diagram of the residential prosumer #1.
Figure 6:
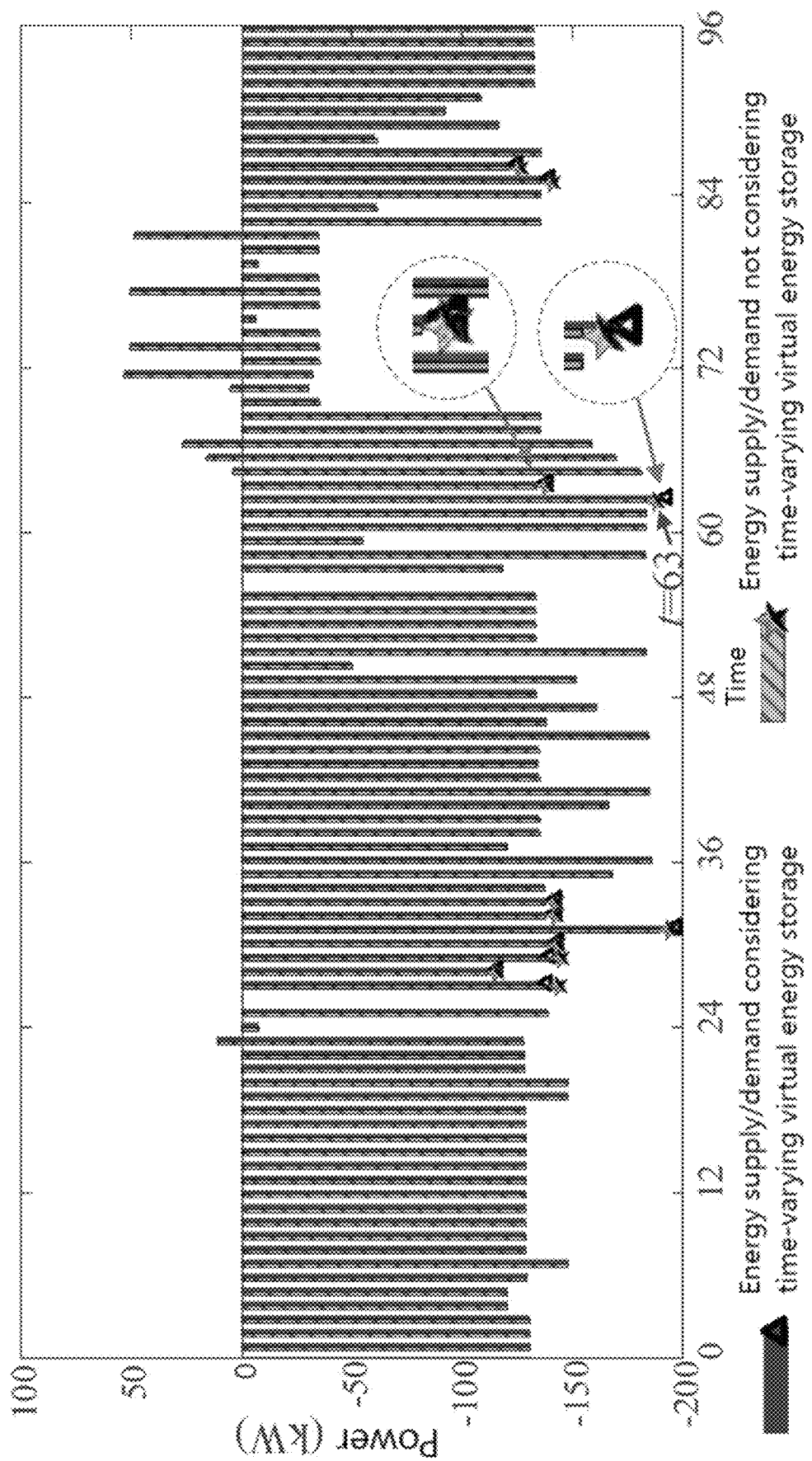
FIG. 6 is a supply and demand capacity diagram of the enterprise prosumer #91.

FIG. 5-FIG. 6 show the changes in supply and demand capacity of the residential prosumer #1 and the enterprise prosumer #91 in each period of the day considering time-varying virtual energy storage and traditional virtual energy storage. The power in the diagram is positive, which indicates the ability of the prosumer to sell electricity, and vice versa indicates the demand of the prosumer to purchase electricity. The power selling capacity (pentagram in the figure) of prosumers in the time-varying virtual energy storage charging period will decrease, and the power purchase demand (triangle in the figure) will not change. In the time-varying virtual energy storage energy supply period, the demand for electricity purchases will increase, and the power sales capacity will remain unchanged. However, due to the influence of building heat dissipation, the change of supply and demand capacity in the time-varying virtual energy storage energy supply period will be less than that in the energy charging period. On the whole, the role of time-varying virtual energy storage in affecting the supply and demand capacity of different periods is similar to that of energy storage batteries, which can provide more flexibility for the prosumers participating in peer-to-peer transactions.

The optimal implementation method:

After inputting some data such as the load power, photovoltaic power generation power, energy storage battery capacity and maximum charge and discharge power, the marginal cost of charging and discharging, and thermal storage building parameters of each prosumer, it is necessary to quantify the supply and demand capacity of the energy resources of the prosumer containing time-varying virtual energy storage. Then, the transaction price of supply and demand capacity is optimized and calculated, and it is integrated with the electricity in supply and demand capacity to become a trade information notice for prosumers. The peer-to-peer energy trading decision optimization method based on continuous double auction is used to optimize the trading decision of prosumers considering multiple trading preference levels to maximize the economic benefits of prosumers, and finally, the optimal trading results are obtained.

The technical features of the above implementation method can be arbitrarily combined. In order to make the description simple, all possible combinations of the technical features in the above implementations are not exhaustive. However, as long as there is no contradiction in the combination of these technical features, it should be considered as the scope recorded in the specification.

For the ordinary technical personnel in this field, on the premise of not deviating from the idea of the invention, some deformations and improvements can be made, which belong to the protection scope of the invention, and the protection scope of the invention is subject to the attached claims.

What is claimed is:

1. A real-time peer-to-peer energy trading method considering time-varying virtual energy storage comprising:
   predicting environmental information in a prediction time domain and integrating historical transaction data into a time-varying virtual energy storage modeling and a real-time peer-to-peer energy trading;
   extracting, in a quantitative extraction stage of supply and demand energy, supply and demand energy and a marginal cost for quantitative trading by a prosumer using an autonomous energy management model for the prosumers;
   optimizing, in a transaction price optimization stage, a price for a transaction based on historical transaction data to maximize income of the prosumers; and
   optimizing a transaction matching decision of the prosumers by using a distributed transaction decision optimization method based on continuous double auction to maximize the income of the prosumers while considering a multi-transaction preference level demand of the prosumers, wherein,
   a method of the time-varying virtual energy storage modeling comprises:
      defining a heating power of temperature control equipment configured to maintain an indoor temperature at a set temperature as a reference heating power, wherein the indoor temperature is maintained unchanged at the set temperature when the heating power of the temperature control equipment is equal to a heat dissipation power, wherein the heating power is defined using the following formulas:

$$Q_{i,t}^{TEMP} - Q_{i,t}^{HD} = C^{Air} \rho^{Air} V_i^{Air} (T_{in,t+1} - T_{in,t}) \quad (1)$$

$$Q_{i,t}^{Base} - Q_{i,t}^{HD} = \alpha^{HD} S_i^{HD} (T_{out,t} - T_{in,t}) \quad (2)$$

wherein,
   $Q_{i,t}^{TEMP}$ is a heating power of the temperature control equipment of the prosumer i in a time t;
   $Q_{i,t}^{HD}$ is a heat dissipation power of a building envelope structure of the prosumer i in the time t;
   $C^{Air}$ is a specific heat capacity of air;
   $\rho^{Air}$ is an air density;
   $V_i^{Air}$ is an air capacity in a building of the prosumer i;
   $T_{in,t+1}$ and $T_{in,t}$ are indoor temperatures of the time t+1 and the time t respectively;
   $Q_{i,t}^{Base}$ is the reference heating power of the prosumer i in the time t;
   $\alpha^{HD}$ is a heat transfer coefficient of the building envelope structure;
   $S_i^{HD}$ is an area of the building envelope structure of the prosumer i;
   $(T_{in,t+1} - T_{in,t})$ is a temperature difference between indoor and outdoor;
   $T_{out,t}$ is an outdoor temperature of the time t; and
   a reference power consumption corresponding to the reference heating power of the temperature control equipment is defined by the following formula:

$$P_{i,t}^{Base} - P_{i,t}^{HD} = \frac{Q_{i,t}^{Base}}{R^{TEMP}}; \quad (3)$$

wherein,
   the temperature remains unchanged when a power consumption of the temperature control equipment is equal to the reference power consumption;
   a virtual energy storage is in a charging state when the power consumption of the temperature control equipment is greater than the reference power consumption; and
   the virtual energy storage is in an energy supply state,
   as defined by the following formula, when the power consumption of the temperature control equipment is less than the reference power consumption:

$$p_{i,t}^{VESS} = \begin{cases} P_{i,t}^{TEMP} - P_{i,t}^{Base} > 0, & \text{Charging} \\ P_{i,t}^{TEMP} - P_{i,t}^{Base} < 0, & \text{Discharging} \end{cases}; \quad (4)$$

wherein,
   $P_{i,t}^{VESS}$ is a charging power of the virtual energy storage system of the prosumer i in the time t;
   $P_{i,t}^{TEMP}$ is the power consumption of the temperature control equipment of the prosumer i in the time t;
   $P_{i,t}^{Base}$ is the reference power consumption of the prosumer i in the time t;
   $P_{i,t}^{HD}$ is a heat dissipation power of the building of the prosumer i in time t; and
   $R^{TEMP}$ is an energy efficiency ratio of the temperature control equipment; calculating a state of charge of the virtual energy storage of the building, wherein a range of the state of charge of the virtual energy storage of the building is 0-1, the calculation of the state of charge of the virtual energy storage of the building is defined by the following formulas:

$$W_{i,t}^{VESS} = \int_{t}^{\tau+\Delta\tau^W} P_{i,t}^{HD} dt; \quad (5)$$

$$\Delta\tau^W = \frac{\ln[T_{in,min} - T_{out,i}] - \ln[T_{in,max} - T_{out,i}]}{-\sum_{n=1}^{N} S_{i,n} \alpha^{HD}/C^{Ac}} \quad (6)$$

$$SOC_{i,i}^{VESS} = \frac{E_{i,i}^{VESS}}{W_{i,i}^{VESS}}; \quad (7)$$

wherein,
$E_{i,t}^{VESS}$ is an energy value of the virtual energy storage of the building of the prosumer i in the time t;
$W_{i,t}^{VESS}$ is a capacity of the virtual energy storage of the building for the prosumer i;
$E_{i,max}^{VESS}$ is a maximum energy value of the virtual energy storage of the building of the prosumer i, and at this time the indoor temperature is $T_{max}$;
$SOC_{i,t}^{VESS}$ is the state of charge of the virtual energy storage of the building of the prosumer i in the time t;
$\Delta\tau^W$ is a heat dissipation time of the building;
$S_{i,n}$ is a single wall area of the building;
N is a number of building walls; and
an objective function of an energy management model for the prosumers, in the quantitative extraction stage of supply and demand energy, is defined by the following formula:

$$\min f_i = C_i^{ES} - M_i^{P2P} + C_i^{Grid} \quad (8);$$

wherein,
$f_i$ is a total cost of the prosumer i;
$C_i^{Grid}$ is a cost of purchasing electricity for the power grid of the prosumer i;
$C_i^{ES}$ is a scheduling cost of energy storage resources for the prosumer i;
$M_i^{P2P}$ is an expected return of a peer-to-peer energy trading for the prosumer i;

$$C_i^{Grid} = \sum_{t=t_0}^{t_0+d} P_{i,t}^{Grid} c_t^{Grid} \Delta t \quad (9)$$

$$c_t^{Grid} = \begin{cases} -c_t^{Grid,feedin} & P_{i,t}^{Grid} > 0 \\ -c_t^{Grid,retail} & \text{otherwise} \end{cases}; \quad (10)$$

wherein,
$c_t^{Grid,feedin}$ and $c_t^{Grid,retail}$ are an on-grid price and a selling price of electricity C, Grid,retail purchased from the power grid in the time t respectively; and
$P_{i,t}^{Grid}$ is a purchasing of and selling power from the power grid by the prosumer i during the time t, wherein a positive value of $P_{i,t}^{Grid}$ indicates the prosumer selling electricity to the power grid, and a negative value of $P_{i,t}^{Grid}$ indicates the prosumer purchasing electricity from the power grid;

$$C_i^{ES} = \sum_{i=i_0}^{i_0+d} [|P_{i,t}^{ba,chg} - P_{i,t}^{ba,dischg}| c_i^{ba} + |P_{i,t}^{EV,chg} - P_{i,t}^{EV,dischg}| c_i^{EV}] \Delta t; \quad (11)$$

wherein,
$C_i^{ES}$ is the scheduling cost of energy storage resources of the prosumer i,
$c_i^{ba}$ is a marginal scheduling cost of a battery;
$c_i^{EV}$ is a marginal scheduling cost of the battery for the prosumer i in the time t;
$P_{i,t}^{ba,chg}$ and $P_{i,t}^{ba,dischg}$ are a charging power and a discharging power of energy and storage battery of the prosumer i in the time t, $P_{i,t}^{EV,chg}$ and $P_{i,t}^{EV,dischg}$ are a charging power and a discharging power of electric vehicle of the prosumer i in the time t;
the positive value indicates charging; and
the negative value indicates discharging; and
calculating an expected cost of peer-to-peer energy trading in the time $t > t_0$ in the scheduling time T is defined by the following formulas:

$$M_i^{P2P} = \sum_{i=i_0}^{i_0+d} P_{i,t}^{P2P} c_t^{P2P} \Delta t \quad (12)$$

$$c_i^{P2P} = \begin{cases} c_i^{MCP} & t > t_0 \\ 0 & \text{otherwise} \end{cases}; \quad (13)$$

wherein,
$P_{i,t}^{P2P}$ is a virtual flexibility resource transaction power for the prosumer i, the positive value of $P_{i,t}^{P2P}$ indicates selling electricity, and the negative value of $P_{i,t}^{P2P}$ indicates purchasing electricity;
$c_{i,t}^{MCP}$ is a predicted value of a market clearing price at time t;
$M_i^{P2P}$ is an expected cost of the transaction;
$c_t^{P2P}$ is a unit power transaction cost of the prosumer i at the time t;
extracting quantitatively, supply and demand capacity of the prosumers in the time $t_0$, using a marginal price analysis method based on the energy management model, by calculating a cost of energy production and utilization $f_i^{min}$ ($P_{i,t_0}^{trade}$) differentiating the power of supply and demand $P_{i,t_0}^{trade} \in [P_{i,t_0}^{trade,min}, P_{i,t_0}^{trade,max}]$ in a $\delta$ step, and integrating an obtained marginal cost or utility to obtain a marginal cost/utility curve with piecewise characteristics;
assuming that a marginal cost curve consists of L segments, each segment contains energy supply information $s_{i,t_0,l}^{P2P,supply}$ for transaction price optimization and transaction execution, comprising a marginal cost $mc_{i,t_0,l}$ and supply power, $P_{i,t_0,l}^{P2P,supply}$ obtaining a supply energy in the energy supply information of the lth segment by a lower boundary ($P_{i,t_0,l}^{P2P,cost}$, $P_{i,t_0,l-1}^{P2P,cost}$) of the lth segment and the l-lth segment, as defined in the following formula, obtaining the marginal cost of the energy supply information in the lth segment by differential calculation:

$$P_{i,t_0,l}^{P2P,supply} = P_{i,t_0,l}^{cost} - P_{i,t_0,l-1}^{cost} \quad (14)$$

assuming a marginal utility curve is composed of K segments, an acquisition method for energy demand information of the kth segment is the same as capacity supply information, a calculation method for the demand energy is defined as follows:

$$P_{i,t_0,k}^{P2P,demand} = P_{i,t_0,k}^{utility} - P_{i,t_0,k-1}^{P2P,utility} \quad (15)$$

obtaining, in the transaction price optimization stage, an optimal price usable for transaction execution, based on the marginal cost/utility and transaction probability obtained in the quantitative extraction stage of supply and demand energy, optimizing a price of the energy supply and demand obtained in the previous stage by the prosumer i to maximize its own economic benefits, a bidding optimization model of the first energy supply and a bidding optimization model of the kth energy demand are defined by the following formulas:

$$\pi_{i,l}^{sell} = \max_{a_{i,l}^{buy} \in (ob,oa)} \left[ (a_{i,l}^{sell} - mc_{i,l}) \cdot p(a_{i,l}^{sell}) \right] \quad (16)$$

$$\pi_{i,k}^{buy} = \max_{b_{i,k}^{buy} \in (ob,oa)} \left[ (mu_{i,k} - b_{i,k}^{buy}) \cdot q(b_{i,k}^{buy}) \right]; \quad (17)$$

wherein,
- $a_{i,l}^{sell}$ is a transaction quote for an energy supply l,
- $b_{i,k}^{buy}$ is a transaction bid for an energy demand k;
- $p(a_{i,l}^{sell})$ and $q(b_{i,k}^{sell})$ are the transaction probabilities for the energy supply l and the energy demand k respectively;
- $\pi_{i,l}^{sell}$ is an electricity sales revenue for the energy supply l;
- $\pi_{i,k}^{buy}$ is a purchase cost of electricity for the energy demand k;
- $mc_{i,l}$ is a marginal cost of the energy supply l;
- $mu_{i,k}$ is a marginal utility of the energy demand k; and
- (ob, oa) are upper and lower limits of the transaction price.

2. The real-time peer-to-peer energy trading method considering time-varying virtual energy storage according to claim 1, wherein environmental information in the time domain comprises light intensity, indoor and outdoor temperature, and market clearing price.

3. The real-time peer-to-peer energy trading method considering time-varying virtual energy storage according to claim 1, wherein a method for an optimization algorithm comprises:

integrating the optimized transaction price and supply and demand electricity quantity into transaction announcement information usable to interact with other prosumers, using a transaction decision optimization method based on continuous double auction to deal with the electricity purchasing and selling capacity comprising transaction price and electricity quantity by the prosumer, the integration comprising the energy supply information $S_i^{sell} = \{s_{i,1}^{sell}, s_{i,2}^{sell}, \ldots, s_{i,l}^{sell}\}$ and the energy demand information $D_i^{buy} = \{d_{i,1}^{buy}, d_{i,2}^{buy}, \ldots, d_{i,k}^{buy}\}$;

selecting information representing a specific energy resource in notification information and sending the information to other prosumers with a preference level m, dividing tradeable prosumers into multiple preference levels $I_{i,l} = \{I_{i,l}^m, I_{i,l}^{m-1}, I_{i,l}^{m-2}, \ldots, I_{i,l}^1\}$;

matching the prosumer with the preference level m to maximize the prosumers income;

recording the information of transaction success or failure in a historical transaction information set, wherein upon failure of the transaction, the prosumer re-prices an optimal transaction price of the transaction probability in a next transaction round according to an updated historical transaction information set, re-formulate the transaction announcement information and initiate the transaction; and selecting prosumers of a next preference level m−1 for trading until the trading market is completely cleared, if an adjusted transaction price remain unchanged, indicating that the prosumers of the preference level m cannot be matched at this time.

* * * * *